(12) United States Patent
Choi et al.

(10) Patent No.: US 9,398,650 B2
(45) Date of Patent: Jul. 19, 2016

(54) LED LIGHTING DEVICE USING BALLAST

(71) Applicant: HiDeep Inc., Seongnam-si, Gyeonggi-do (KR)

(72) Inventors: Jaeyoung Choi, Daegu (KR); Heeseok Han, Gyeonggi-do (KR)

(73) Assignee: HiDeep Inc., Gyeonggi-do (KR)

( * ) Notice: Subject to any disclaimer, the term of this patent is extended or adjusted under 35 U.S.C. 154(b) by 48 days.

(21) Appl. No.: 14/246,499

(22) Filed: Apr. 7, 2014

(65) Prior Publication Data

US 2014/0306615 A1 Oct. 16, 2014

(30) Foreign Application Priority Data

Apr. 11, 2013 (KR) .......................... 10-2013-0039696

(51) Int. Cl.
*H05B 37/00* (2006.01)
*H05B 33/08* (2006.01)

(52) U.S. Cl.
CPC ........... *H05B 33/0815* (2013.01); *Y02B 20/383* (2013.01)

(58) Field of Classification Search
CPC ........... H05B 33/0803; H05B 33/0815; H05B 33/0896
USPC ...... 315/185 R, 200 R, 209 R, 291, 307, 308, 315/219
See application file for complete search history.

(56) References Cited

U.S. PATENT DOCUMENTS

| 8,502,454 | B2 * | 8/2013 | Sadwick ............ H05B 33/0809 315/291 |
| 2013/0038239 | A1 | 2/2013 | Chiang |
| 2013/0049621 | A1 | 2/2013 | Yan et al. |
| 2013/0221867 | A1 * | 8/2013 | Deppe ................ H05B 33/0809 315/224 |
| 2014/0152184 | A1 | 6/2014 | Tomiyama et al. |

FOREIGN PATENT DOCUMENTS

JP 2010-238661 A 10/2010
(Continued)

OTHER PUBLICATIONS

Office Action mailed Oct. 31, 2014 in related Korean Application No. 10-2013-0039696 (5 pgs.).
(Continued)

*Primary Examiner* — Thuy Vinh Tran
(74) *Attorney, Agent, or Firm* — Foley & Lardner LLP

(57) ABSTRACT

An LED lighting device includes: an LED unit which includes at least one LED device; and a rectifier which rectifies a current power signal output from the ballast and transfers the rectified current power signal to the LED unit. When the ballast is a low-frequency ballast having an output frequency less than 60 Hz, the rectifier opens between a main path for supplying power to the rectifier from the ballast and an auxiliary path for preheating a starter or filament of the ballast. When the ballast is a high-frequency ballast having the output frequency greater than 20 kHz, the rectifier short-circuits between the main path for supplying the power to the rectifier from the ballast and the auxiliary path for preheating the filament of the ballast.

13 Claims, 14 Drawing Sheets

(56) References Cited

FOREIGN PATENT DOCUMENTS

| | | |
|---|---|---|
| JP | 2013-016419 A | 1/2013 |
| KR | 2008-0008759 A | 1/2008 |
| KR | 2010-0012706 A | 2/2010 |
| KR | 100949087 B1 | 3/2010 |
| KR | 2010-0136912 A | 12/2010 |
| KR | 2012-0098441 A | 9/2012 |

OTHER PUBLICATIONS

Office Action mailed Jun. 23, 2014 in related Korean Application No. 10-2013-0019310 (4 pgs.).

Office Action mailed Dec. 16, 2014 in related Korean Application No. 10-2013-0019310 (4 pgs.).

Non-Final Office Action mailed Jan. 21, 2016 in co-pending U.S. Appl. No. 14/186,613 (14 pgs.).

* cited by examiner

<Current boost>

LED LIGHTING DEVICE USING BALLAST

CROSS-REFERENCE TO RELATED APPLICATIONS

This application claims the benefit of Korean Application No. 10-2013-0039696, filed on Apr. 11, 2013, the contents of which are hereby incorporated by reference in their entirety into the present disclosure.

BACKGROUND

1. Field

The present invention relates to an LED lighting device using a ballast.

2. Description of Related Art

Recently, a light emitting diode (LED) is being increasingly used as a new lighting device in place of a filament bulb or a fluorescent lamp and becomes popular. The LED can be driven at a low voltage and has a longer life span, lower power consumption, a more rapid response speed and stronger crashworthiness than those of other lighting devices. The LED can become smaller and lighter. However, since the LED is activated by a very low direct current power and is turned on in a manner different from that of the fluorescent lamp, a general LED lamp cannot be applied as it is to a fluorescent lamp system. In particular, an electronic ballast converts a commercial alternating current power of 60 Hz into a radio frequency of several tens of KHz, and then provides to the lamp. Therefore, conventional lighting devices as well as the ballast should be removed in order to use the LED lighting device. If an LED driving circuit is directly connected to the connection terminal of the conventional ballast without removing the ballast, etc., the LED driving circuit is not able to process the high frequency or voltage of the ballast, etc., so that the LED lamp does not work or is destroyed.

Accordingly, recently, an LED lighting device capable of being directly connected to the ballast and used without removing the ballast is being developed.

SUMMARY

One embodiment is an LED lighting device using a ballast. The LED lighting device includes: an LED unit which includes at least one LED device; and a rectifier which rectifies a current power signal output from the ballast and transfers the rectified current power signal to the LED unit. When the ballast is a low-frequency ballast having an output frequency less than 60 Hz, the rectifier opens between a main path for supplying power to the rectifier from the ballast and an auxiliary path for preheating a starter or filament of the ballast. When the ballast is a high-frequency ballast having the output frequency greater than 20 kHz, the rectifier short-circuits between the main path for supplying the power to the rectifier from the ballast and the auxiliary path for preheating the filament of the ballast.

According to the embodiment, the rectifier may include: a first rectifier including a first impedance connected in parallel to a first electrode and a second electrode, which receive the power from the ballast, and at least one rectifier diode; and a second rectifier including a second impedance which is connected in parallel to a third electrode and a fourth electrode, which receive the power from the ballast, and at least one rectifier diode.

According to the embodiment, when the ballast is a magnetic ballast using a low frequency signal, the first impedance and the second impedance may be opened, and when the ballast is an electronic ballast using a high frequency signal, the first impedance and the second impedance may be short-circuited.

According to the embodiment, the first impedance and the second impedance may have a value from $1/100$ to $1/10$ of an impedance based on an parallel capacitor of the electronic ballast, which is connected in parallel between the first rectifier and the second rectifier.

According to the embodiment, the LED lighting device may further include a current driving unit which receives an output current of the rectifier and controls the power which is transmitted from the ballast to the LED unit. The current driving unit may transmit current which has a magnitude greater than that of the output current of the rectifier to the LED unit.

According to the embodiment, the current driving unit may include: a switch which electrically connects or disconnects transmission of some of the received ballast output power to the LED unit; a diode which allows the current to continuously flow to the LED unit when the switch is in an off-state; and a capacitor and an inductor which store and release energy respectively in a reciprocal manner.

According to the embodiment, the LED lighting device may further include a current sensor which senses a magnitude of the current flowing through the LED unit; and a controller which receives the magnitude of the current flowing through the LED unit from the current sensor and controls on/off of the switch.

According to the embodiment, the controller may increase a duty of the switch when the value of the current flowing through the LED unit is greater than a predetermined current value, and decrease the duty of the switch when the value of the current flowing through the LED unit is less than a predetermined current value.

According to the embodiment, the current driving unit may include a switch which connects or disconnects electrically transmission of some of the received ballast output power to the LED unit; a diode which allows the current to continuously flow to the LED unit when the switch is in an off-state; a capacitor which stores or releases energy; and a transformer which electrically separates the ballast from the LED unit.

According to the embodiment, the LED lighting device may further include a current sensor which senses a magnitude of the current flowing through the LED unit; and a controller which receives the magnitude of the current flowing through the LED unit from the current sensor and controls on/off of the switch.

According to the embodiment, the controller may increase a duty of the switch when the value of the current flowing through the LED unit is greater than a predetermined current value, and may decrease the duty of the switch when the value of the current flowing through the LED unit is less than a predetermined current value.

According to the embodiment, the LED lighting device may further include a filter which smoothes an output signal of the current driving unit and transmits to the LED unit.

DETAILED DESCRIPTION

Figure 1:
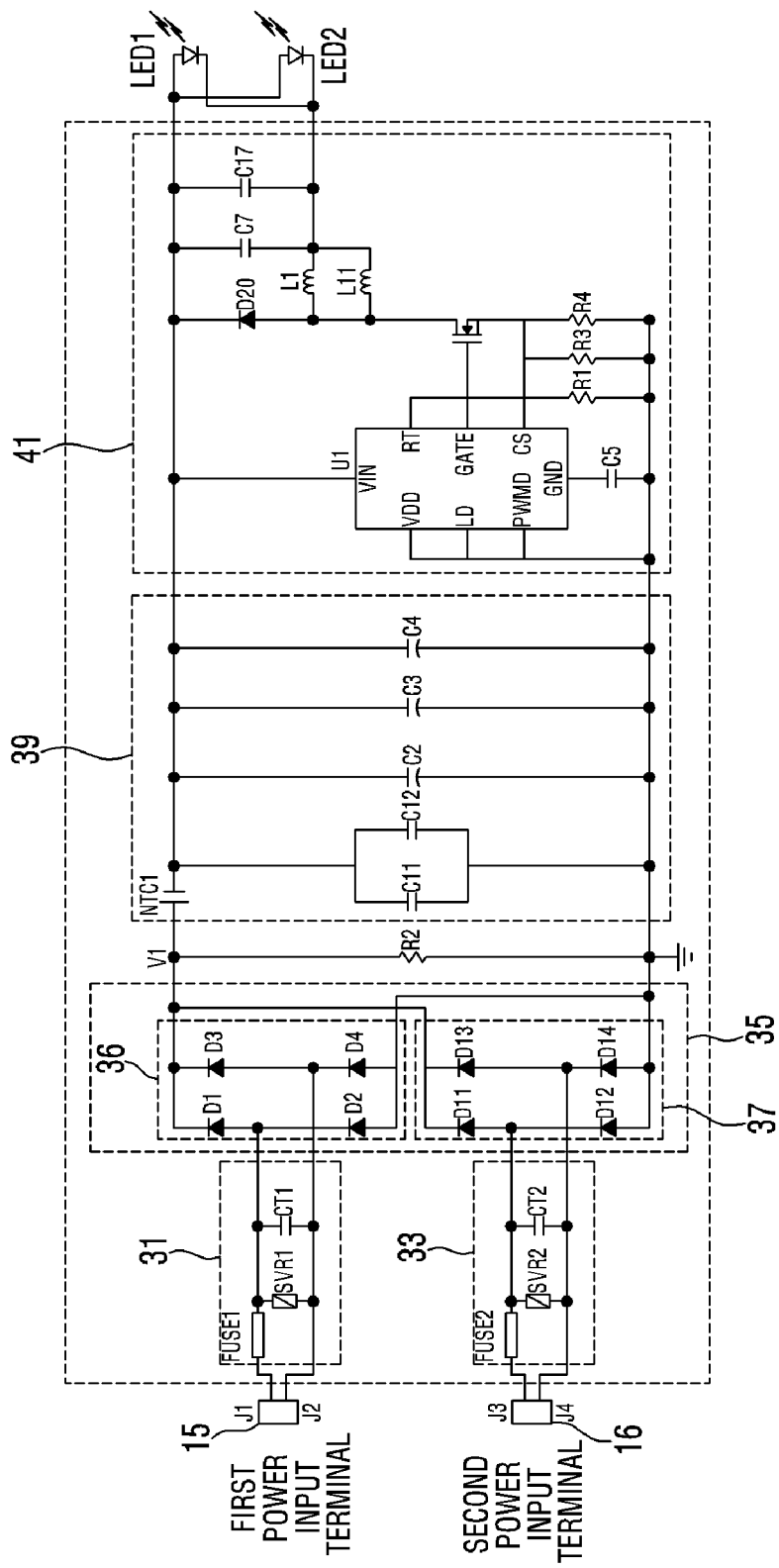
FIG. 1 is a circuit diagram of an LED lighting device using a ballast.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Embodiment of the Present Invention

The principle of an LED lighting device using a ballast in accordance with the embodiment of the present invention will be briefly described.

FIG. 1 shows an LED lighting device using a ballast.

Referring to FIG. 1, in the LED lighting device, power sources 31 and 33 receive alternating current power through power input terminals 15 and 16. A rectifier 35 receives and full-wave rectifies the power from the power sources 31 and 33, and then transmits to a filter 39. The filter 39 smoothes the full-wave rectified voltage from the rectifier 35 into a direct current voltage, and then transmits to a driving unit 41. The driving unit 41 includes a buck-boost converter and controls the voltage and current which are supplied to the LED to be constant by using the direct current voltage output from the filter 39.

However, the LED lighting device shown in FIG. 1 has a structure for controlling only the power transmitted to the LED by using a voltage converter without consideration of the output of the ballast. When the output power of the ballast is larger than the power required by the LED, energy is accumulated in the capacitor of the filter 39 and the voltage continuously rises. Describing in more detail, in the LED lighting device in a steady state, when the current which is input from the ballast for any reason is increased, the amount of electric charges accumulated in the capacitor of the filter 39 is increased, and thus, the voltage at both sides of the capacitor of the filter 39 rises. Since the LED lamp consumes a constant power, the amount of the current which is transmitted from the filter 39 to the LED lamp becomes less than that of the steady state. Therefore, since the amount of the current which is input to the filter 39 is less than the amount of the current which is output from the filter 39, a voltage higher than an acceptable value is applied to the filter 39 comprised of the capacitors due to a positive feedback phenomenon in which the voltage at both sides of the capacitor of the filter 39 is continuously increased, so that passive devices or chips of the LED lighting device are damaged. That is, the lifespan of the LED lighting device is shortened. Besides, the LED lighting device is not compatible with various ballasts having different standards and has stability vulnerable to the power change. In particular, the ballast of the currently and widely used fluorescent lamp or halogen lamp has a different operating method from that of the LED device and has problems to be used in direct connection with the LED device.

The below-described LED lighting device using the ballast in accordance with the embodiment of the present invention is able to overcome the above-mentioned problems.

Hereafter, the LED lighting device using the ballast in accordance with the embodiment of the present invention will be described.

Figure 2:
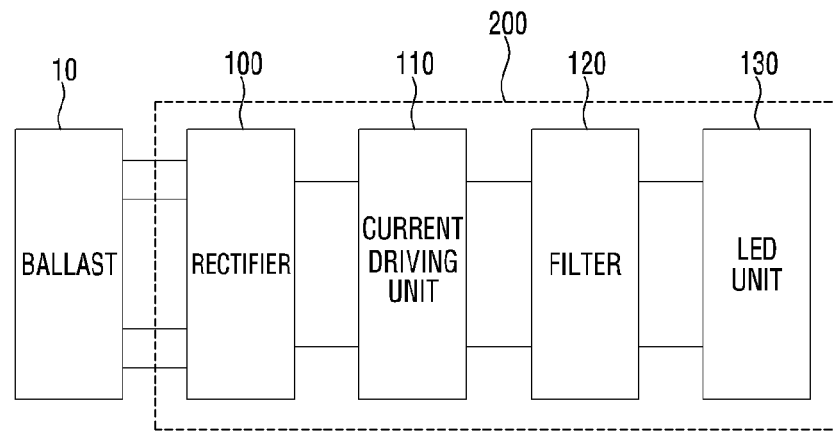
FIG. 2 is a block diagram of an LED lighting device using a ballast according to an embodiment of the present invention.

FIG. 2 is a block diagram of an LED lighting device 200 using a ballast according to an embodiment of the present invention.

Referring to FIG. 2, the LED lighting device using the ballast according to the embodiment of the present invention includes an LED unit 130 which includes at least one LED device, a rectifier 100 which rectifies a current power signal output from a ballast 10, and a current driving unit 110 which receives an output signal of the rectifier 100 and controls the power which is transmitted from the ballast 10 to the LED unit 130.

Also, the LED lighting device 200 using the ballast according to the embodiment of the present invention may further include a filter 120 which smoothes the output signal of the current driving unit 110 and transmits to the LED unit 130.

The ballast according to the embodiment of the present invention may be used in the fluorescent lamp or halogen lamp, etc.

Figure 3:
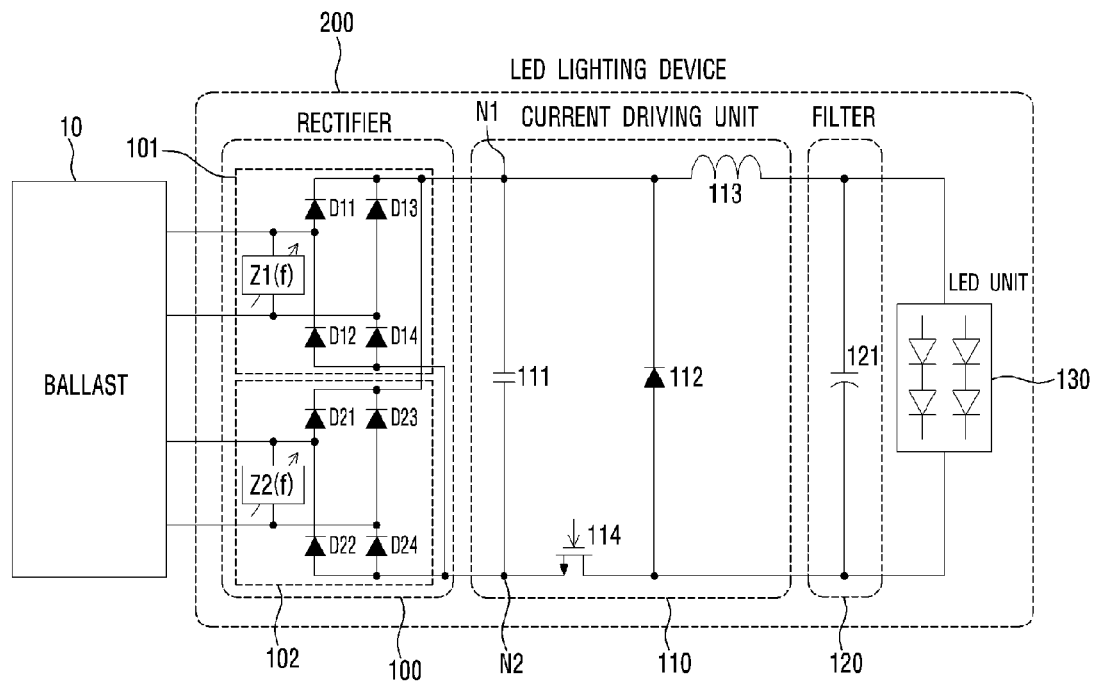
FIG. 3 is a circuit diagram of an LED lighting device using a ballast according to the embodiment of the present invention.

FIG. 3 is a circuit diagram of the LED lighting device using the ballast according to the embodiment of the present invention.

As shown in FIG. 3, the rectifier 100 of the LED device 200 using the ballast according to the embodiment of the present invention may include a first rectifier 101 and a second rectifier 102 which rectify the current power input from the ballast 10. Further, the current driving unit 110 receives the output power of the rectifier 100 and controls the power which is transmitted from the ballast 10 to the LED unit 130. The current driving unit 110 transmits current which has the magnitude greater than that of the output current of the rectifier 100 to the LED unit 130. The current driving unit 110 may include a current boost converter which includes a capacitor 111, a diode 112, an inductor 113, and a switch 114. The diode 112 may be a switching element which operates complementarily to the switch 114. The filter 120 may be implemented by a capacitor unit 121 including at least one capacitor, and the LED unit 130 may include at least one LED device.

Hereafter, the rectifier 100 of the LED lighting device 200 using the ballast according to the embodiment of the present invention will be described.

The LED lighting device to which the rectifier 100 is applied according to the embodiment of the present invention will be briefly described.

Figure 4A:
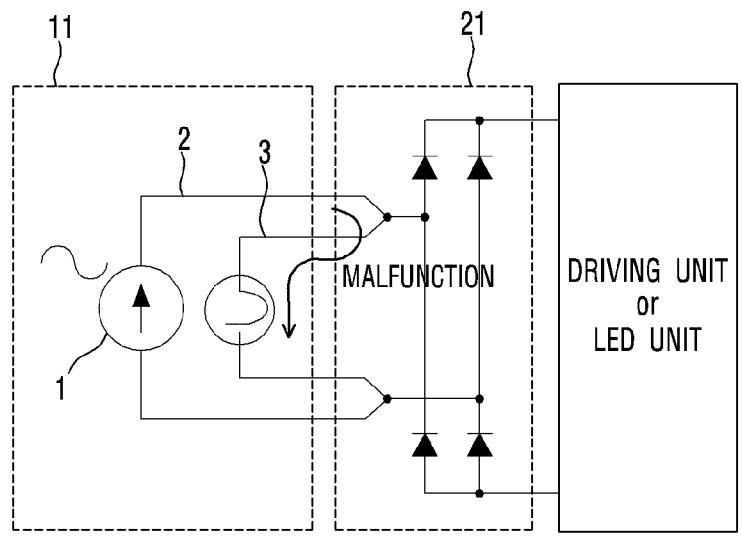
FIG. 4a is a circuit diagram showing that both ends of a lamp are connected to a choke magnetic ballast by using a two-terminal short-circuit rectifier.
Figure 4B:
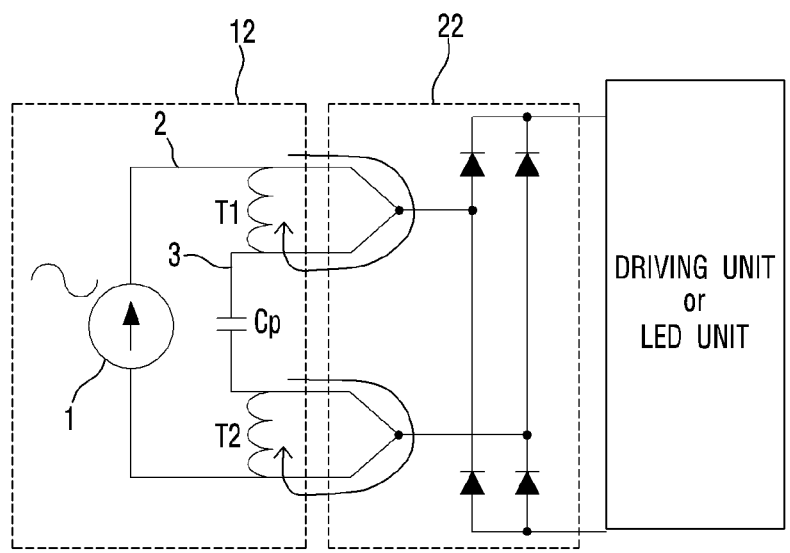
FIG. 4b is a circuit diagram showing that both ends of the lamp are connected to a rapid start magnetic ballast by using the two-terminal short-circuit rectifier.
Figure 4C:
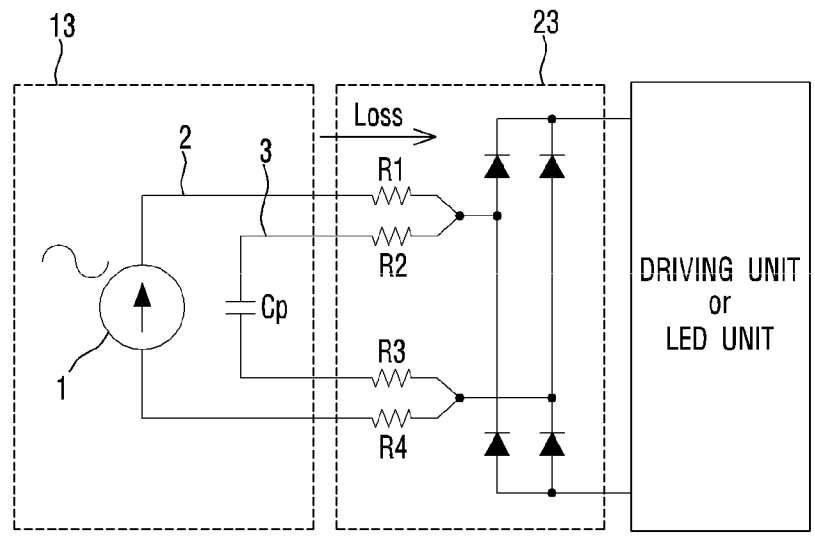
FIG. 4c is a circuit diagram showing that both ends of the lamp are connected to a rapid start electronic ballast by using a rectifier into which a resistor of filament has been inserted.
Figure 4D:
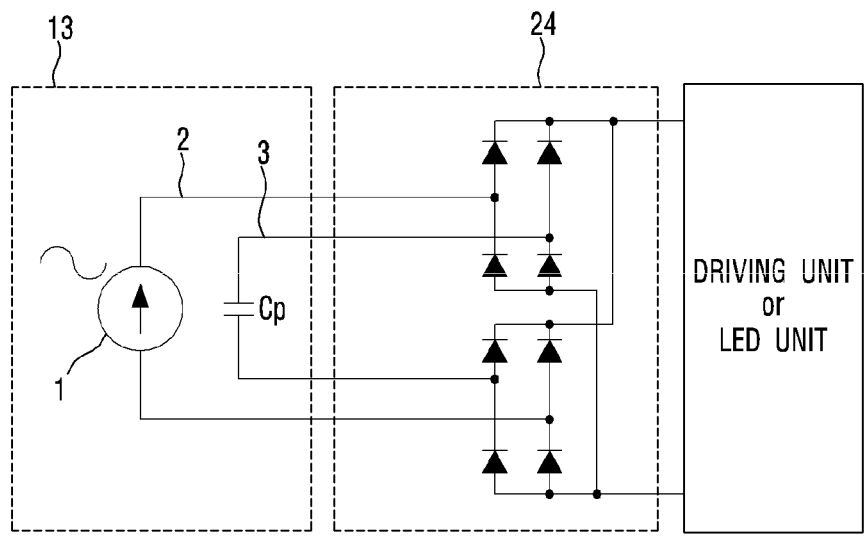
FIG. 4d is a circuit diagram showing that both ends of the lamp are connected to the rapid start electronic ballast by using a rectifier inserted into the both ends of the lamp respectively.
Figure 4E:
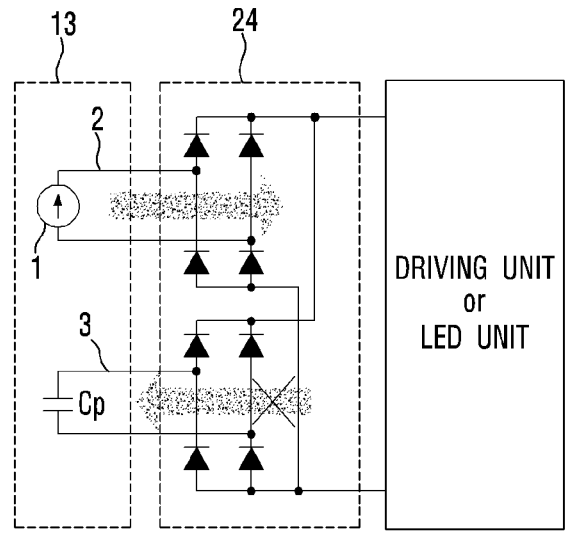
FIG. 4e shows an equivalent circuit to that of FIG. 4d.

FIG. 4a shows that both ends of a lamp are connected to a choke magnetic ballast by using a two-terminal short-circuit rectifier. FIG. 4b shows that both ends of the lamp are connected to a rapid start magnetic ballast by using the two-terminal short-circuit rectifier. FIG. 4c shows that both ends of the lamp are connected to a rapid start electronic ballast by using a rectifier into which a resistor of filament has been inserted. FIG. 4d shows that both ends of the lamp are connected to the rapid start electronic ballast by using a rectifier inserted into the both ends of the lamp respectively. FIG. 4e shows an equivalent circuit to that of FIG. 4d.

As shown in FIG. 4a, for the purpose of obtaining a discharge voltage, a choke magnetic ballast 11 makes use of a choke (starter) which becomes an open state or short-circuit state at a particular point of time. In the choke magnetic ballast 11 using a common rectifier 21, a starter path of an auxiliary path 3 required for discharging is not separated. Therefore, since a voltage source path of a main path 2 is not separated from the starter path of the auxiliary path 3, the choke required for alternately opening and short-circuiting may malfunction.

As shown in FIG. 4b, in the rapid start magnetic ballast 12, filament is preheated by a first transformer T1 and a second transformer T2, and the characteristics of a current source is obtained by using the first and second transformers T1 and T2. However, when the main path 2 and the auxiliary path 3 are short-circuited, excess current is generated by the transformer, thereby causing problems in stability and reducing the efficiency of the ballast.

As shown in FIG. 4c, in the rapid start electronic ballast 13, when the resistance value of filament, i.e., about 3Ω (R1 to R4) is inserted into the rectifier 23, all the problems caused by the short-circuit of the main path 2 and the auxiliary path 3 can be overcome. However, the power is consumed by the resistors R1 to R4 of the current source path, i.e., the main path 2, so that the efficiency of the lighting device is reduced.

Meanwhile, when the rectifier 24 including the first and second rectifiers on both sides of the LED lamp is applied to the magnetic ballast, the starter path or the transformer path is separated, thereby solving the problem caused by the short-circuit. However, as shown in FIG. 4d, when the rectifier 24 including the first and second rectifiers is applied to the rapid start electronic ballast 13, a parallel capacitor Cp included in a resonator of the electronic ballast 13 is removed, so that the resonance characteristics of the ballast 13 are changed. Accordingly, it is not possible for the ballast to normally operate. Referring to FIG. 4e, though the rectifier 24 transmits the power received from the ballast 13 to the driving unit or LED unit, the driving unit or LED unit cannot transmit the power to the rectifier 24. Therefore, there occurs an effect that the auxiliary path 3 is isolated and this is beneficial to the magnetic ballast. However, since the auxiliary path 3 is opened in the electronic ballast 13 and there occurs an effect that the parallel capacitor Cp is removed, so that it is expected that the ballast may malfunction due to the resonator change.

In the meantime, though not shown in FIGS. 4a to 4e, with regard to some of program start electronic ballasts, when the filament is short-circuited, a voltage is not sensed in the filament, so that the program start electronic ballast is turned on later or is never turned on.

Figure 5:
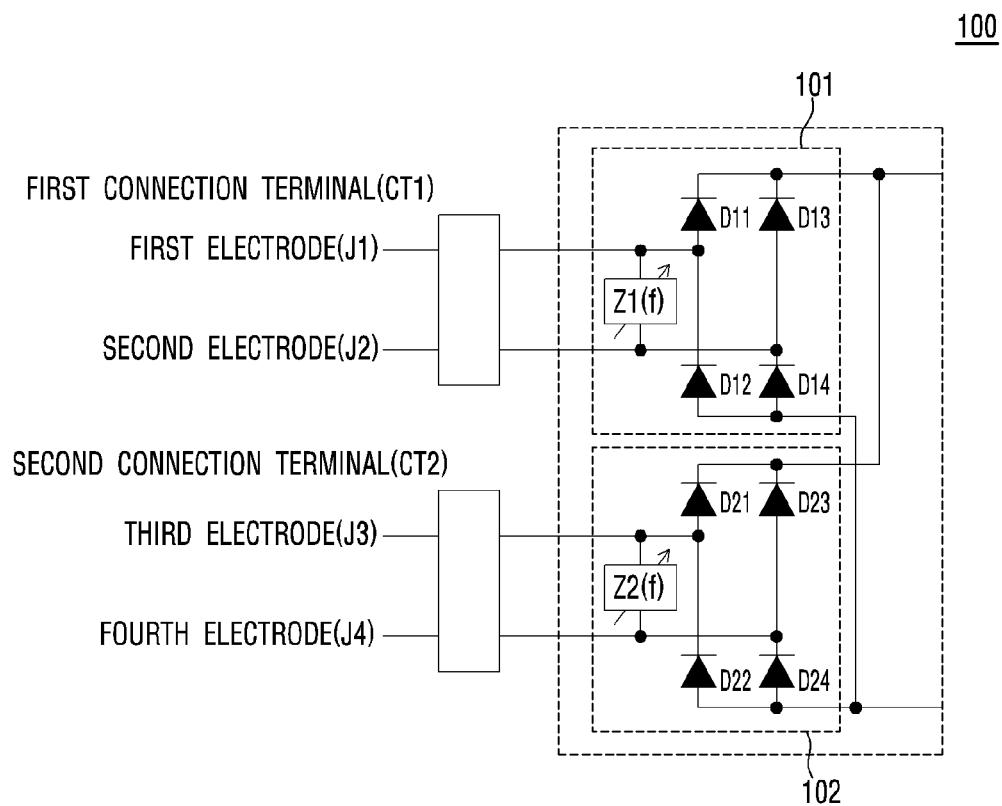
FIG. 5 is a circuit diagram of the rectifier according to the embodiment of the present invention.

FIG. 5 shows the rectifier according to the embodiment of the present invention, which is capable of solving the problems of the rectifiers shown in FIGS. 4a to 4e.

Referring to FIGS. 3 and 5, bridge diodes D11 to D14 of the first rectifier 101 and bridge diodes D21 to D24 of the second rectifier 102 have the same wiring (connection direction of the diode, etc.) combination with respect to a first connection terminal CT1 and a second connection terminal CT2, respectively, which receive the power from the ballast. This intends to cope with the fact that the connection terminals or electrodes are optionally connected to each other in the general lighting device. Also, the rectifier 100 according to the embodiment of the present invention may include a first electrode J1, a second electrode J2, a third electrode J3, and a fourth electrode J4.

As shown in FIGS. 3 and 5, when the alternating current power of the ballast including four or two electrodes is input through the first to fourth electrodes J1 to J4, the first rectifier 101 and the second rectifier 102 output the full wave rectified voltage to the current driving unit 110. In the bridge diode combination (D11 to D14 and D21 to D24), it is preferable to use a high-frequency diode for processing the alternating current power of a frequency several hundreds times as much as a commercial electric power output from the ballast.

Also, when the rectifier 100 according to the embodiment of the present invention is connected to the magnetic ballast, the auxiliary path for preheating the starter or filament of the ballast is removed. When the rectifier 100 is connected to the electronic ballast, a circuit connecting the auxiliary path is configured. For this, the rectifier 100 according to the embodiment of the present invention includes a first impedance $Z1(f)$ which is connected in parallel to the first electrode J1 and the second electrode J2, and a second impedance $Z2(f)$ which is connected in parallel to the third electrode J3 and the fourth electrode J4. The impedance values of the first impedance $Z1(f)$ and the second impedance $Z2(f)$ may be changed depending on the input frequency f.

FIGS. 6a to 6d are circuit diagrams showing concrete circuit types of the rectifier 100 in accordance with the embodiment of the present invention.

Figure 6A:
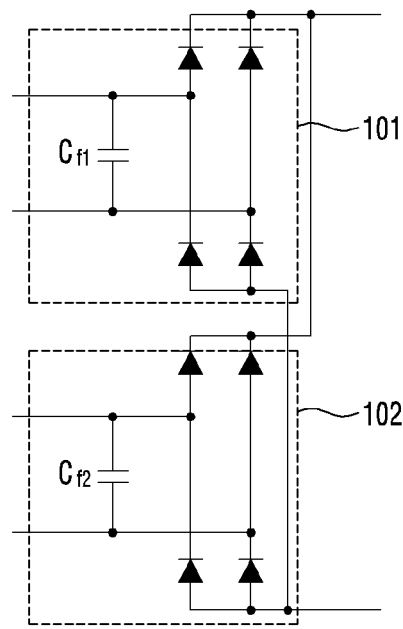
FIGS. 6a to 6d are circuit diagrams showing various implementation examples of the rectifier in accordance with the embodiment of the present invention.

Referring to FIG. 6a, the first impedance $Z1(f)$ and the second impedance $Z2(f)$ may be implemented by a first filament capacitor Cf1 and a second filament capacitor Cf2 respectively. Therefore, the first filament capacitor Cf1 and the second filament capacitor Cf2 are opened at a low frequency and are short-circuited at a high frequency. Since the magnetic ballast uses a low frequency signal of about 50 to 60 Hz and the electronic ballast uses a high frequency signal greater than 20 KHz, the auxiliary path is opened in the magnetic ballast using the low frequency signal and is short-circuited in the electronic ballast using the high frequency signal. It is preferable that the capacitances of the first and second filament capacitors Cf1 and Cf2 are sufficiently greater than the capacitance of the parallel capacitor Cp of the electronic ballast. Thus, as viewed from the auxiliary path, the impedance based on the first and second filament capacitors Cf1 and Cf2 has a negligible size. The electronic ballast uses an LC resonator and outputs a desired level of power by matching the switching frequency to the resonance frequency. The 10% change of the center frequency of the resonator has no influence on the operation of the ballast. However, there may be a problem of output reduction of the ballast when the center frequency of the resonator changes more than 10%. The first and second filament capacitors Cf1 and Cf2 are connected in series to the parallel capacitor Cp between the main path 2 to which the power is supplied from the inductor and the auxiliary path 3 connected to the parallel capacitor. Therefore, in order that the resonant frequency changes less than 10%, the first and second filament capacitors Cf1 and Cf2 are required to be equal to or more than ten times the parallel capacitor Cp. Accordingly, since the capacitance of the parallel capacitor Cp of the general electronic ballast is approximately 5 nF, it is preferable that the first and second filament capacitors Cf1 and Cf2 have a value greater than 50 nF. Meanwhile, the first and second filament capacitors Cf1 and Cf2 should have a relatively large impedance between the main path 2 and the auxiliary path 3 such that most of the current of the main path 2 is transferred to an LED driving unit without being transferred to the auxiliary path 3. Therefore, the first and second filament capacitors Cf1 and Cf2 should have an impedance value greater than ten times that of a fluorescent lamp or a halogen lamp. Since the equivalent resistance of a general fluorescent lamp is about 1 k$\Omega$, a sum of serial impedances of the first and second filament capacitors Cf1 and Cf2 should be greater 10 k$\Omega$ at 60 Hz, i.e., the output frequency of the electronic ballast. Thus, in order to ignore the current flowing to the auxiliary path, the first and second filament capacitors Cf1 and Cf2 should have an impedance value greater than 500 nF respectively. As a result, it is recommended that the first and second impedances should have a value from 1/100 to 1/10 of the impedance based on the parallel capacitor of the electronic ballast.

Figure 6B:
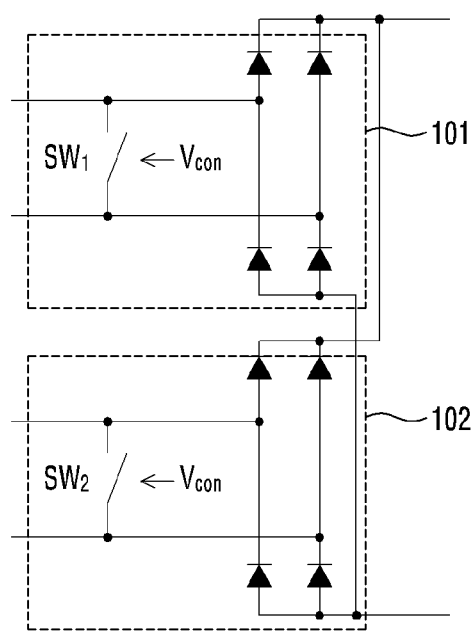

Referring to FIG. 6b, the first impedance Z1(f) and the second impedance Z2(f) may be implemented by a first switch SW1 and a second switch SW2 respectively.

When the magnetic ballast is connected to the lighting device, both ends of the first and second switches SW1 and SW2 are opened, and when the electronic ballast is connected to the lighting device, both ends of the first and second switches SW1 and SW2 are short-circuited. Accordingly, the on/off of the first and second switches SW1 and SW2 is set in advance in accordance with the kind of the ballast, the lighting device according the embodiment of the present invention is compatible with all of the magnetic ballast and electronic ballast. Also, the rectifier may further include a circuit which senses the output frequency of the ballast and changes the state of the switch. The on/off operation of the first and second switches SW1 and SW2 may be controlled by a control voltage Vcon. Meanwhile, for the purpose of fast switching, the first and second switches SW1 and SW2 may be transistors, and specifically, may be MOS field-effect transistors (MOSFET) or bipolar junction transistors (BJT).

Figure 6C:
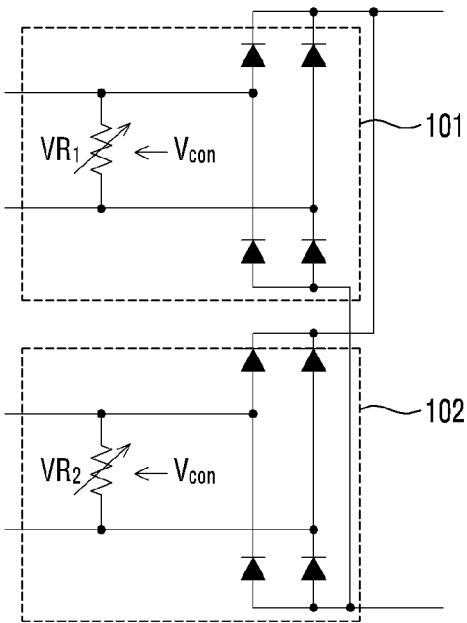

Referring to FIG. 6c, the first impedance Z1(f) and the second impedance Z2(f) may be implemented by a first variable resistor VR1 and a second variable resistor VR2 respectively.

When the magnetic ballast is connected to the lighting device, the first and second variable resistors VR1 and VR2 have a very high resistance value in such a manner that both ends of the variable resistor are close to the open state. When the electronic ballast is connected to the lighting device, the first and second variable resistors VR1 and VR2 have a very low resistance value in such a manner that both ends of the variable resistor are close to the short-circuit state. Therefore, the resistance values of the first and second variable resistors VR1 and VR2 are set in advance in accordance with the kind of the ballast, the lighting device according the embodiment of the present invention is compatible with all of the magnetic ballast and electronic ballast. Also, the rectifier may further include a circuit which senses the output frequency of the ballast and changes the resistance value of the variable resistor. The resistance values of the first and second variable resistors VR1 and VR2 may be implemented by the resistor and switch. The switch can be controlled by the control voltage Vcon.

Figure 6D:
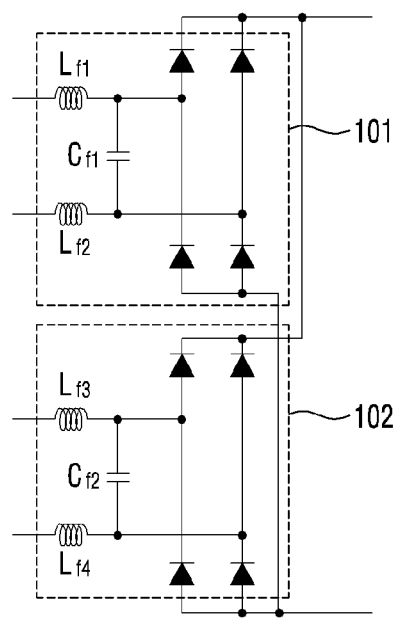

Referring to FIG. 6d, the first impedance Z1(f) and the second impedance Z2(f) may be implemented by a first resonator and a second resonator.

As shown in FIG. 6d, the first resonator may be a band pass filter including two inductors Lf1 and Lf2 and one capacitor Cf1. The second resonator may be a band pass filter including two inductors Lf3 and Lf4 and one capacitor Cf2.

When the magnetic ballast is connected to the lighting device, the first resonator and second resonator set a pass band frequency in such a manner that both ends of the capacitors Cf1 and Cf2 are opened. When the electronic ballast is connected to the lighting device, the first resonator and second resonator set a pass band frequency in such a manner that both ends of the capacitors Cf1 and Cf2 are short-circuited. Specifically, since the electronic ballast operates at a frequency of 30 to 75 KHz, the first resonator and second resonator may be implemented by an LC resonator having a low selectivity in such a manner as to have a low impedance in a band of 30 to 75 KHz. Also, a method for varying the capacitors Cf1 and Cf2 of the first and second resonators may be used in order to control the pass band. The capacitor may be varied by a plurality of the capacitors and switches.

In summary, the rectifier 100 according to the embodiment of the present invention includes two rectifiers 101 and 102. When the magnetic ballast is connected to the lighting device, each of the rectifiers 101 and 102 operates in such a manner as to cause the main path and the auxiliary path to be opened, and when the electronic ballast is connected to the lighting device, each of the rectifiers 101 and 102 operates in such a manner as to cause the main path and the auxiliary path to be short-circuited. Also, the circuit including the first and second impedances Z1(f) and Z2(f) of FIGS. 6a and 6d is not necessarily implemented independently and may be implemented to include two or more circuits.

FIGS. 7a to 7d are block diagrams of the LED lighting device including the rectifier in accordance with the embodiment of the present invention.

Figure 7A:
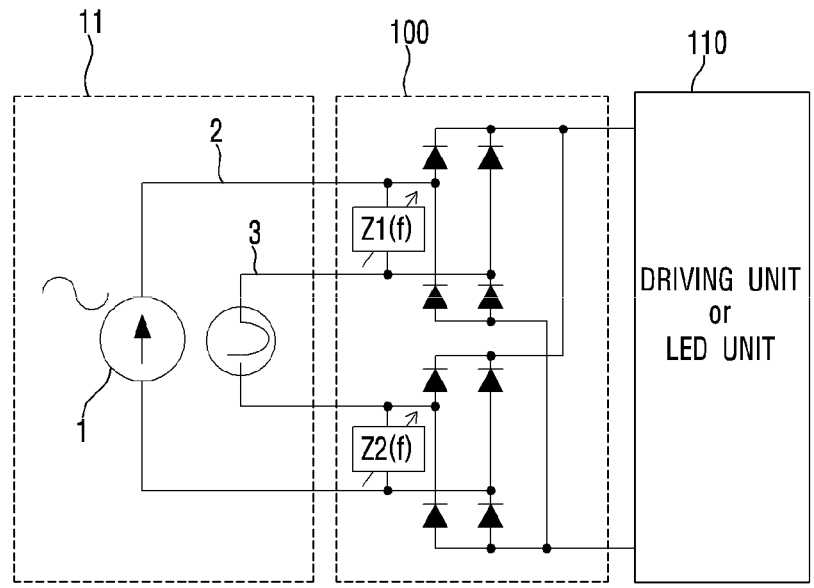
FIGS. 7a to 7d are circuit diagrams of the LED lighting device using the rectifier in accordance with the embodiment of the present invention and are views showing that the LED lighting device is connected to various ballasts.

As shown in FIGS. 4a and 7a, when the common rectifier 21 is applied to the choke magnetic ballast 11, the starter path 3 required for discharging the voltage is not separated from the current source path 2, so that there is a possibility of malfunction. However, the rectifier 100 according to the embodiment of the present invention receives the low frequency signal of the magnetic ballast, so that the first and second impedances Z1(f) and Z2(f) are opened. Accordingly, the starter path 3 is isolated, and thus, the possibility of malfunction is removed.

Figure 7B:
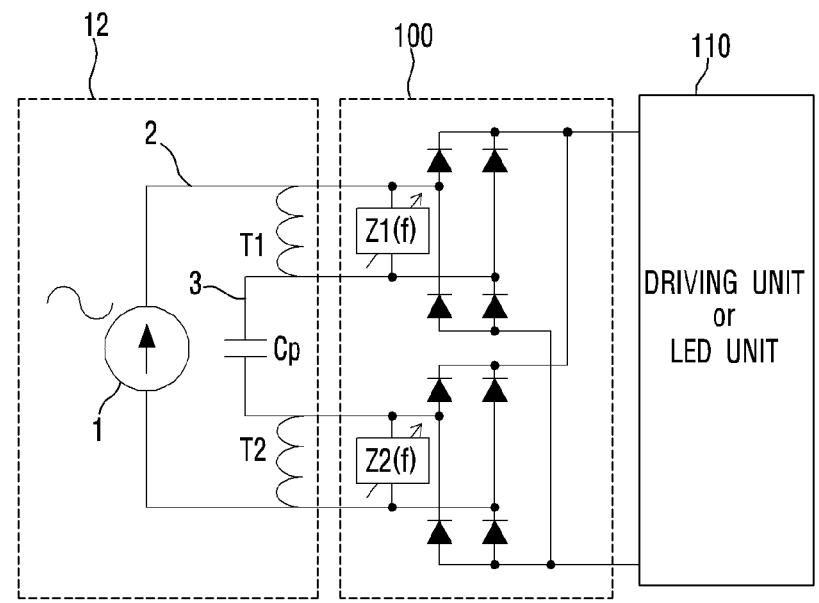

As shown in FIGS. 4b and 7b, in a case where the common rectifier 22 is applied to the rapid start magnetic ballast 12, when the current source path 2 and the auxiliary path 3 are short-circuited, excess current is generated, thereby causing problems in stability and reducing the efficiency of the ballast. However, since the rectifier 100 according to the embodiment of the present invention receives the low frequency signal of the magnetic ballast, the magnitude of the filament current becomes closer to 0. Accordingly, it is possible to solve the problems in stability of the lighting device and the reduction of the efficiency of the ballast.

Figure 7C:
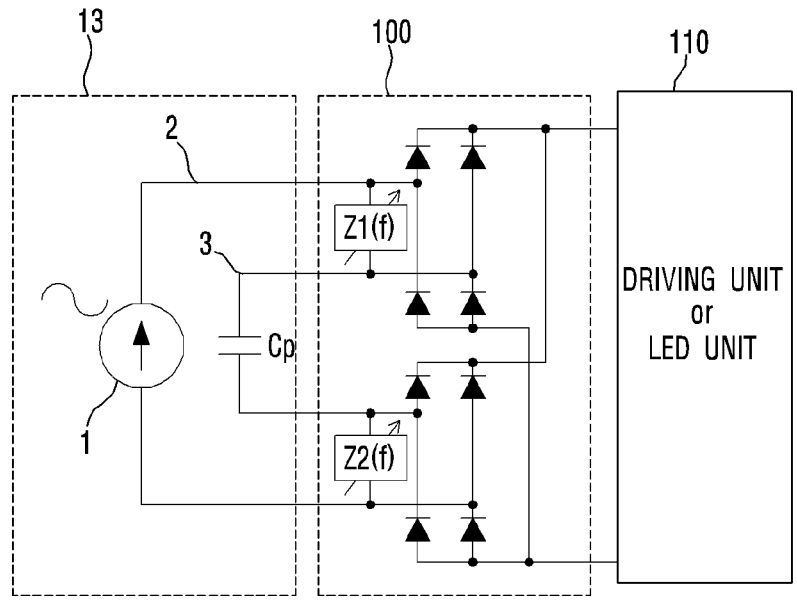

As shown in FIGS. 4c and 7c, when the common rectifier 23 is applied to the rapid start magnetic ballast 13, most of the problems caused by the short-circuit are overcome. However, the power is consumed in the resistor of the current source path 2, so that the efficiency of the lighting device is reduced. However, the rectifier 100 according to the embodiment of the present invention receives the high frequency signal of the electronic ballast, so that the first and second impedances Z1(f) and Z2(f) are short-circuited and the auxiliary path is connected. Further, since no resistor is used, there is no power loss and the efficiency of the lighting device can be enhanced.

Figure 7D:
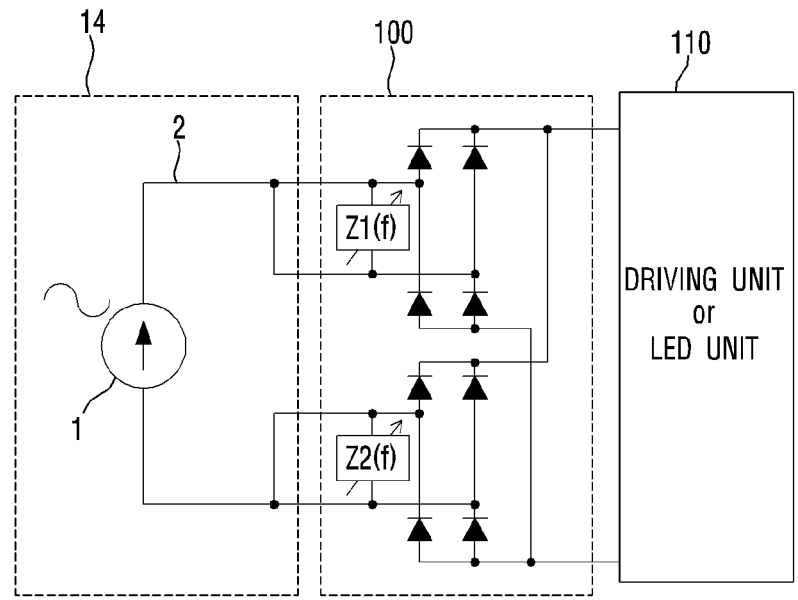

Meanwhile, with regard to an instant start electronic ballast 14 with a two-terminal output, as shown in FIG. 7d, even when the rectifier 100 according to the embodiment of the present invention is connected to a fluorescent lamp ballast with the two-terminal output, the rectifier 100 is not influenced by the short-circuit. Accordingly, the lighting device according the embodiment of the present invention is compatible with the ballast with the two-terminal output.

In summary, the rectifier 100 according to the embodiment of the present invention is compatible with all of the electronic ballast and magnetic ballast and consumes less power.

Next, the current driving unit 110 of the LED lighting device 200 using the ballast according to the embodiment of the present invention will be described.

As briefly described above, the LED lighting device using the ballast shown in FIG. 1 makes use of the voltage converter such as a voltage boost converter or a voltage buck converter in order to supply the constant power to the LED unit. However, since the power source which transmits the power from the ballast to the LED lighting device is not a voltage source but a current source, there is a limit to control the power through use of the voltage converter. Therefore, in the LED lighting device using the ballast shown in FIG. 1, the filter which converts the current source input from the ballast into the voltage source is inserted between rectifier and the voltage converter. When the amount of the current input from the ballast is increased, the voltage converter reduces the amount of the current output so as to transmit the constant power to the LED unit, so that the voltage which is applied to the capacitor of the filter is more increased. Consequently, the LED lighting device using the common voltage converter has a problem that the voltage which is applied to the capacitor of the filter rises excessively.

For the purpose of solving the above-mentioned problem, as shown in FIG. 3, the current driving unit 110 of the LED lighting device using the ballast in accordance with the embodiment of the present invention may use the current boost converter which controls the current power which is applied from the rectifier 100.

As shown in FIG. 3, the current driving unit 110 receives the rectified signal output from the rectifier 100 and controls the power which is transmitted from the ballast to the LED unit. That is, the current driving unit 110 outputs a rated voltage and current signal for the LED unit 130 by using the ballast output. The current driving unit 110 includes a first terminal N1 and a second terminal N2 and transmits/receives the current signal rectified by using the rectifier 100 through the first terminal N1 and the second terminal N2. The current driving unit 110 may include the current boost converter which receives the current power from the rectifier 100 and supplies the current power to the LED unit 130. The current driving unit 110 includes the switch 114 which electrically connects or disconnects the transmission of some of the received ballast output power to the LED unit, the diode 112 which allows the current to continuously flow to the LED unit when the switch is in an off-state, the capacitor 111 and the inductor 113 which store and release the energy in a reciprocal manner. The switch 114 may be implemented by a transistor. Also, though it has been described in the embodiment of the present invention that the current flows continuously to the LED unit 130 by using the diode 112, the component allowing the current to flow continuously to the LED unit 130 is not necessarily limited to the diode 112, and it is enough as long as the component is a switching element which operates complementarily to the switch 114. The switching element may include MOS field-effect transistors (MOSFET) or bipolar junction transistors (BJT), etc.

As shown in FIG. 3, in the current driving unit 110, the capacitor 111 is connected between the first terminal N1 and the second terminal N2, and the cathode of the diode 112 is connected to the first terminal N1 and the anode of the diode 112 is connected to an end of the switch 114 and an end of the LED unit 130. One end of the inductor 113 is connected to the first terminal N1 and the other end of the inductor 113 is connected to the positive terminal or negative terminal of the LED unit 130. One end of the switch 114 is connected to the second terminal N2 and the other end of the switch 114 is connected to the positive terminal or negative terminal of the LED unit 130.

Figure 8A:
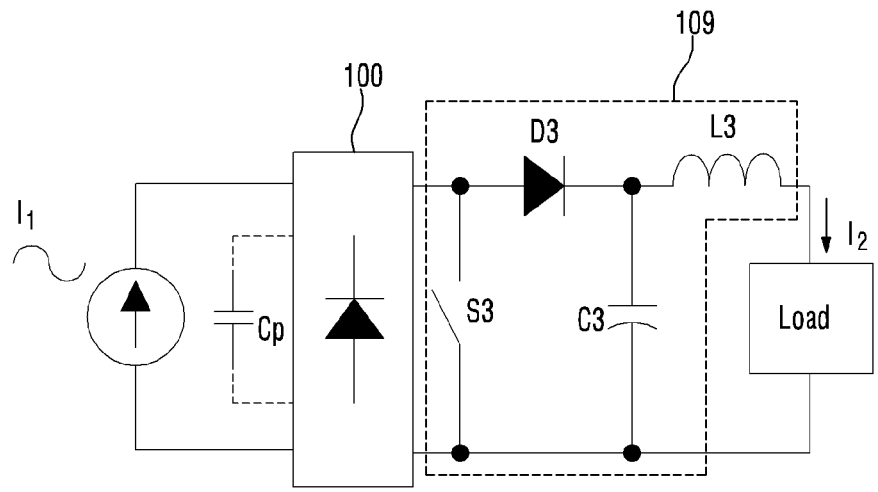
FIG. 8a shows the LED lighting device including a current buck converter.
Figure 8B:
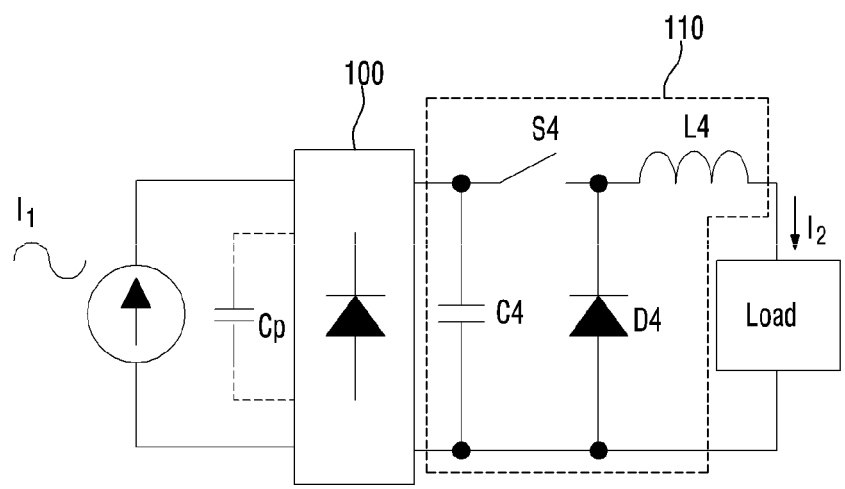
FIG. 8b shows the LED lighting device including a current boost converter.

FIG. 8a shows the LED lighting device using the ballast including a current buck converter. FIG. 8b shows the LED lighting device using the ballast including the current boost converter in accordance with the embodiment of the present invention.

A current buck driver 109 using the current buck converter shown in FIG. 8a and the current driving unit 110 including the current boost converter shown in FIG. 8b are in common with each other in that they basically receive the current power and transmit the power to loads. However, the current buck driver 109 shown in FIG. 8a controls such that the magnitude of the current which is transmitted to a load unit is less than the magnitude of the current which is input to the current buck driver 109. Therefore, the magnitude of the voltage which is transmitted to the load unit is increased so as to transmit the constant power to the load unit. If the load unit is an LED device, a high voltage higher than 60 V may be applied to the LED device. In some regions like US, etc., tempered glass is required for ensuring stability when the high voltage higher than 60 V is applied to the LED device. As a result, transparency becomes lower, and thus, optical efficiency is decreased. However, in the current driving unit 110 including the current boost converter, which is contrary to the above-mentioned current buck driver 109, the current which is applied to the LED device is increased, so that the magnitude of the voltage which is applied to the LED device is reduced. Accordingly, the problem of the above-described current buck driver 109 does not occur. In other words, the current driving unit 110 including the current boost converter in accordance with the embodiment of the present invention has a better stability for the voltage than that of the current buck driver 109, a low cost, and a high optical efficiency when applied to the lighting device. Also, the ballast is a non-ideal current source having the parallel capacitor Cp. The current buck structure which is switched in parallel with the current source input discharges the capacitance of the parallel capacitor Cp, so that the efficiency of the lighting device may be reduced. Therefore, it is advantageous to apply the current boost structure which is not switched in parallel with the current source input.

Referring to FIG. 3, the filter 120 includes the capacitor and smoothes the voltage and current controlled by the current driving unit 110, and then supplies to the LED unit 130. The filter 120 may include the capacitor unit including at least one capacitor. It is recommended that the filter 120 is designed to have a time constant sufficient to smooth the power including a high-frequency ripple which is supplied from the current driving unit 110, thereby preventing the LED from flickering due to the change of the current value.

The LED unit 130 includes LED devices which emit light by using the voltage and current supplied from the filter 120. The LED devices included in the LED unit 130 are connected in series or in parallel and lighted.

Figure 9:
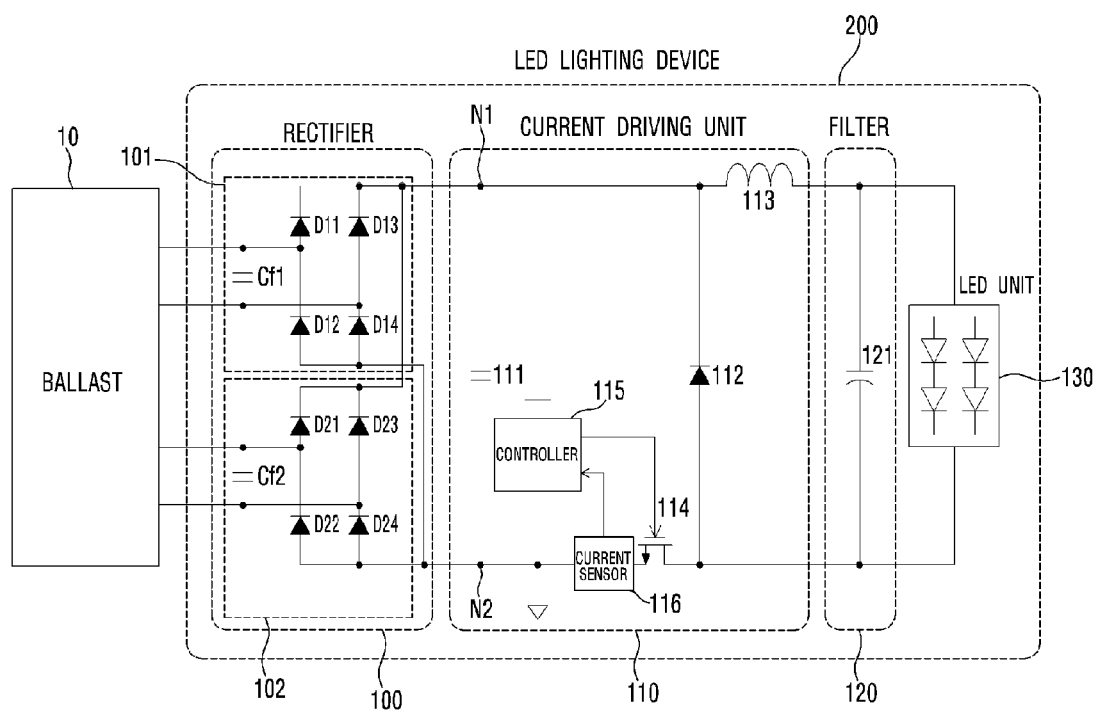
FIG. 9 is a circuit diagram of an LED lighting device according to another embodiment of the present invention.

FIG. 9 is a circuit diagram of the LED lighting device which further includes a controller controlling the current flowing through the LED unit and uses the ballast in accordance with the embodiment of the present invention.

Referring to FIG. 9, the current driving unit 110 includes the capacitor 111, the diode 112, the inductor 113, and the switch 114 of FIG. 3, and further includes a controller 115 and a current sensor 116. The controller 115 controls the on/off of the switch 114. The current sensor 116 senses the current flowing through the LED unit 130 and transmits the magnitude of the current to the controller 115.

That is, regarding various ballasts having different device values, it is possible to control such that the magnitude of the power consumed by the LED unit 130 is constant by controlling the duty of the switch 114 of the current driving unit 110. Specifically, the controller 115 receives the magnitude of the current flowing through the LED unit 130 from the current sensor 116 and controls the on/off of the switch 114. Rated voltage and current required by the LED part 130 can be supplied in a manner that when the value of the current flowing through the LED unit 130 is greater than a predetermined current value, the duty of the switch 114 is increased, and when the value of the current flowing through the LED unit 130 is greater than a predetermined current value, the duty of the switch 114 is decreased. Therefore, regardless of the device characteristics of the ballast, since the constant power can be supplied to the LED unit 130 through the on/off control of the switch 114, the lighting device according the embodiment of the present invention is compatible with various ballasts. Also, since the power required by the LED unit 130 is supplied, it is possible to fundamentally remove the problems that energy is accumulated in the filter 120, the LED brightness cannot be controlled, etc., due to the fact that the output power of the ballast does not match the power consumed by the LED lighting device, thereby preventing chips or passive devices, for example the filter 120 from being damaged.

The rectifier 100 according to the embodiment of the present invention includes two rectifiers having the filament capacitor respectively, so that the lighting device according the embodiment of the present invention is compatible with all of the magnetic ballast and the electronic ballast.

Figure 10:
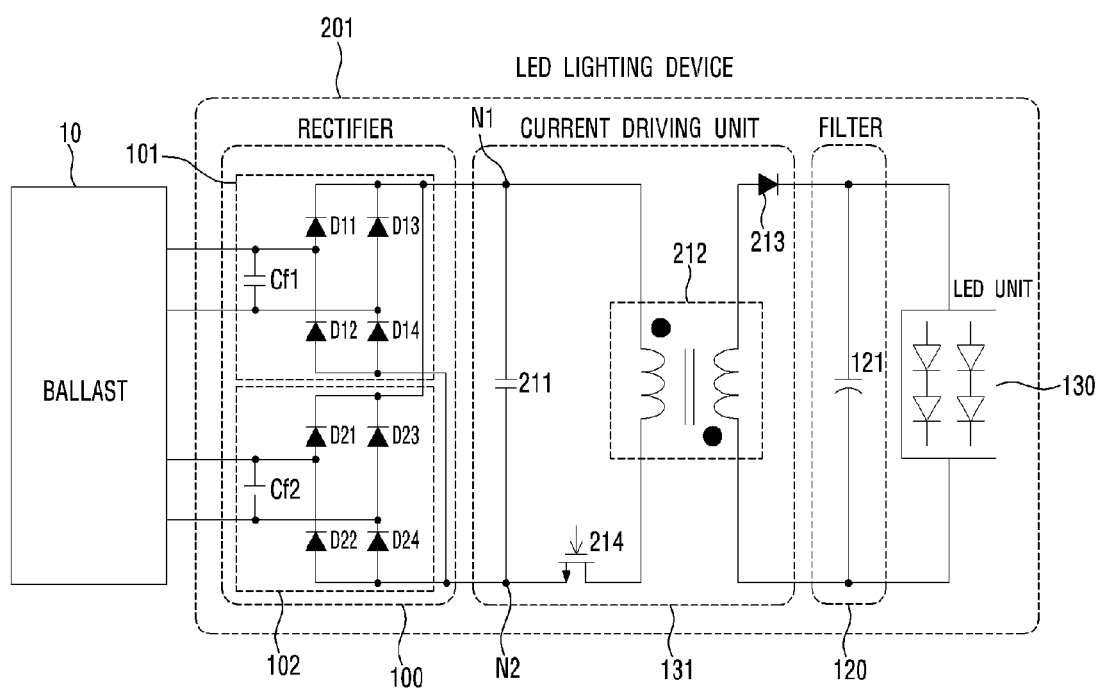
FIG. 10 is a circuit diagram of an LED lighting device according to further another embodiment of the present invention.

FIG. 10 shows a current driving unit according to another embodiment of the present invention.

Referring to FIG. 10, a current driving unit 131 of an LED lighting device 201 according to the another embodiment of the present invention includes a transformer circuit.

Figure 11A:
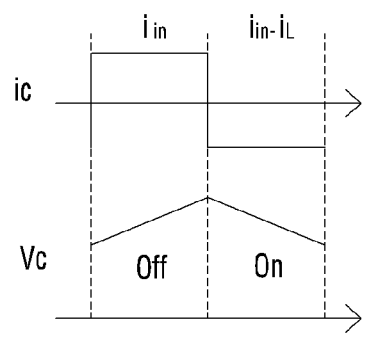
FIG. 11a shows a circuit of a current driving unit including the current boost converter and shows a waveform of a specific signal.
Figure 11A:
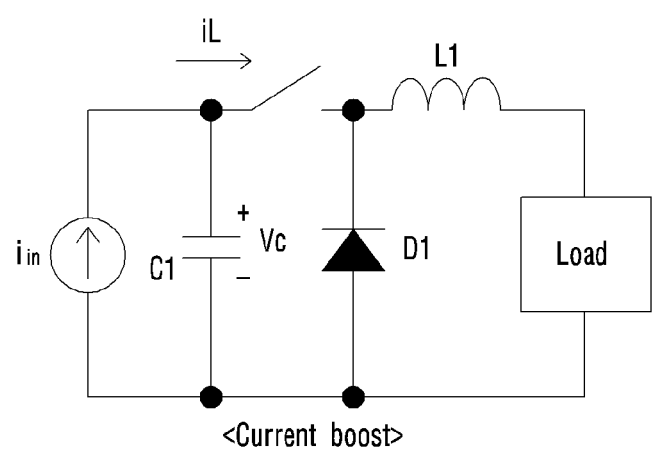
Figure 11B:
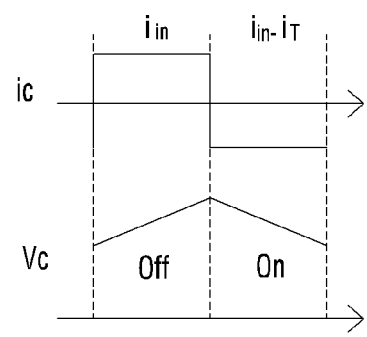
FIG. 11b shows a circuit of a current driving unit using a transformer and shows a waveform of a specific signal.
Figure 11B:
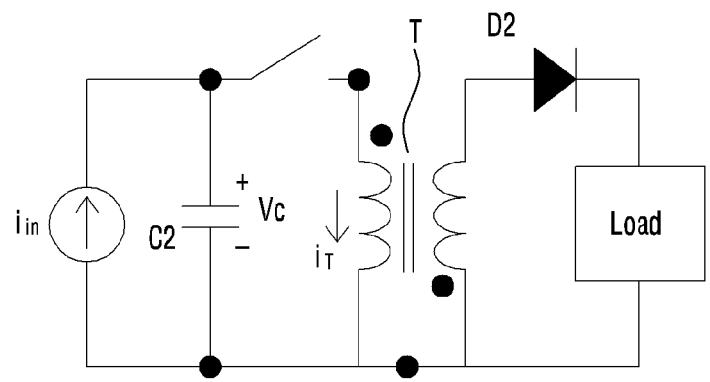

FIG. 11a shows a waveform of a specific signal of the current driving unit including the current boost converter. FIG. 11b shows a waveform of a specific signal of the current driving unit using a transformer.

Referring to FIGS. 11a and 11b, it can be understood that the current ic and voltage Vc which are applied to the capacitors C1 and C2 when the switch is in an off-state are the same as the current ic and voltage Vc which are applied to the capacitors C1 and C2 when the switch is in an on-state.

As shown in FIGS. 10, 11a, and 11b, the current driving unit 131 including the transformer 212 controls the power which is transmitted from the ballast 10 to the LED unit 130. Depending on the turns ratio of the transformer 212, the current driving unit 131 of the LED lighting device 201 according to the another embodiment of the present invention is able to transmit current having a magnitude greater than that of the output current of the rectifier 100 to the LED unit 130. The current driving unit 131 according to the another embodiment of the present invention may include a switch 214, a diode 213, a capacitor 211, and the transformer 212. The switch 214 connects or disconnects electrically the transmission of some of the received ballast output power to the LED unit 130. The diode 212 allows the current to continuously flow to the LED unit 130 when the switch 214 is in an off-state. The capacitor 211 stores or releases the energy when the switch 214 is in an on and off-state. The transformer 212 separates electrically the ballast 10 from the LED unit 130.

Since the current driving unit 131 according to the embodiment of the present invention isolates the ballast 10, i.e., the first side of the transformer 212 from the LED unit 130, i.e., the second side of the transformer 212 by using the transformer 212, the stability of the LED lighting device 201 can be improved. The LED lighting device 201 including the current driving unit 131 using the transformer also adjusts the duty of the switch 214, thereby supplying rated voltage and current required by the LED part 130

As described above, according to the embodiment of the present invention, it is possible to easily implement the LED lighting device using the ballast. That is, the power which is transmitted from the ballast is transmitted as the power required by the LED unit through the current driving unit, so that the passive devices or chips of the lighting device can be protected. Further, the rated voltage and current are supplied to the LED unit and loads applied to other passive devices or chips can be reduced. Accordingly, the LED lighting device is compatible with any conventional ballast according to the power control of the controller, and it is possible to stably supply the power and to protect the circuit element.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. An LED lighting device using a ballast, the LED lighting device comprising:
   an LED unit including at least one LED device; and
   a rectifier configured to rectify a current power signal output from the ballast and transfer the rectified current power signal to the LED unit and selectively provide, based on an output frequency of the ballast, an open-circuit or a short-circuit between a main path for supplying power to the rectifier from the ballast and an auxiliary path for preheating a starter or filament of the ballast,
   wherein, when the ballast is a low-frequency ballast having an output frequency less than 60 Hz, the rectifier is configured to provide an open-circuit between the main path for supplying power to the rectifier from the ballast and the auxiliary path for preheating the starter or filament of the ballast,
   wherein, when the ballast is a high-frequency ballast having an output frequency greater than 20 kHz, the rectifier is configured to provide a short-circuit between the main path for supplying the power to the rectifier from the ballast and the auxiliary path for preheating the filament of the ballast.

2. The LED lighting device of claim 1, wherein the rectifier comprises:
   a first rectifier including a first impedance connected in parallel to a first electrode and a second electrode, which receive the power from the ballast, and at least one rectifier diode; and
   a second rectifier including a second impedance connected in parallel to a third electrode and a fourth electrode, which receive the power from the ballast, and at least one rectifier diode.

3. The LED lighting device of claim 2, wherein, when the ballast is a magnetic ballast using a low frequency signal, the first impedance and the second impedance are opened, and wherein, when the ballast is an electronic ballast using a high frequency signal, the first impedance and the second impedance are short-circuited.

4. The LED lighting device of claim 3, wherein, when the ballast is the electronic ballast, the first impedance and the second impedance have a value from $1/100$ to $1/10$ of an impedance based on a parallel capacitor of the electronic ballast, which is connected in parallel between the first rectifier and the second rectifier.

5. The LED lighting device of claim 1, further comprising a current driving unit configured to:
   receive an output current of the rectifier and control the power which is transmitted from the ballast to the LED unit, and
   transmit current which has a magnitude greater than a magnitude of the output current of the rectifier to the LED unit.

6. The LED lighting device of claim 5, wherein the current driving unit comprises:
   a switch configured to electrically connect or disconnect transmission of a portion of the received ballast output power to the LED unit;
   a diode configured to allow the current to continuously flow to the LED unit when the switch is in an off-state; and
   a capacitor and an inductor configured to store and release energy in a reciprocal manner.

7. The LED lighting device of claim 6, further comprising:
   a current sensor configured to sense a magnitude of the current flowing through the LED unit; and
   a controller configured to receive the magnitude of the current flowing through the LED unit from the current sensor and control on/off of the switch.

8. The LED lighting device of claim 7, wherein the controller is configured to increase a duty of the switch when the value of the current flowing through the LED unit is greater than a predetermined current value, and decrease the duty of the switch when the value of the current flowing through the LED unit is less than the predetermined current value.

9. The LED lighting device of claim 5, wherein the current driving unit comprises:
   a switch configured to electrically connect or disconnect transmission of a portion of the received ballast output power to the LED unit;
   a diode configured to allow the current to continuously flow to the LED unit when the switch is in an off-state;
   a capacitor configured to store or release energy; and
   a transformer configured to electrically separate the ballast from the LED unit.

10. The LED lighting device of claim 9, further comprising:
    a current sensor configured to sense a magnitude of the current flowing through the LED unit; and
    a controller configured to receive the magnitude of the current flowing through the LED unit from the current sensor and control on/off of the switch.

11. The LED lighting device of claim 10, wherein the controller is configured to increase a duty of the switch when the value of the current flowing through the LED unit is greater than a predetermined current value, and decrease the duty of the switch when the value of the current flowing through the LED unit is less than the predetermined current value.

12. The LED lighting device of claim 11, further comprising a filter configured to smooth an output signal of the current driving unit and transmit the smoothed output signal of the current driving unit to the LED unit.

13. The LED lighting device of claim 1, further comprising a filter configured to smooth an output signal of the current driving unit and transmit the smoothed output signal of the current driving unit to the LED unit.

* * * * *